(12) United States Patent
Kato et al.

(10) Patent No.: US 7,005,149 B2
(45) Date of Patent: *Feb. 28, 2006

(54) FRUIT VINEGAR FROM RAW MATERIAL FLAVORFUL ACID CITRUS FRUIT JUICE AND METHOD FOR PRODUCING THE SAME

(75) Inventors: Yukihisa Kato, Aichi (JP); Naoya Hirayama, Aichi (JP); Toshikazu Omori, Aichi (JP); Munehiro Hoshino, Aichi (JP); Yutaka Fujii, Aichi-ken (JP)

(73) Assignees: Pokka Corporation, Aichi-ken (JP); Maruboshi Vinegar Co., Ltd., Fukuoka-ken (JP); Sakamoto Koryo Co., Ltd., Tokyo (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 216 days.

(21) Appl. No.: 09/144,851

(22) Filed: Sep. 1, 1998

(65) Prior Publication Data

US 2001/0038869 A1    Nov. 8, 2001

(30) Foreign Application Priority Data

Sep. 8, 1997 (JP) .................................. 9-257987
Aug. 28, 1998 (JP) ................................ 10-257640

(51) Int. Cl.
*C12J 1/00* (2006.01)
*C12J 1/04* (2006.01)
(52) U.S. Cl. ........................................................ 426/17
(58) Field of Classification Search ................... 426/17
See application file for complete search history.

(56) References Cited

U.S. PATENT DOCUMENTS 5,415,775 A * 5/1995 Castillon et al. ............ 210/490

FOREIGN PATENT DOCUMENTS

JP          4190780       * 7/1992

OTHER PUBLICATIONS

Jackson, R.S., Wine Science, Academic Press, New York, 1994, pp. 229, and 279.80.*
Mahanta, K.C., "Acetic Acid Fermentation from Citrus Fruit Juice," Science and Culture, 1968, 348-350, 34(8).
Abstract of Japanese Patent No. 61224980.
Abstract of Japanese Patent No. 04190780.
Abstract of Japanese Patent No. 62061580.
Abstract of Japanese Patent No. 57043679.

* cited by examiner

*Primary Examiner*—Keith Hendricks
(74) *Attorney, Agent, or Firm*—Browdy and Neimark, PLLC

(57) ABSTRACT

The present invention relates to a method for producing fruit vinegar, comprising subjecting a flavorful acid citrus fruit juice with an inherently low citric acid content and/or a flavorful acid citrus fruit juice with a reduced citric acid content by acid reduction treatment as a raw material, after alcohol is added thereto by alcohol fermentation and/or addition of alcohol, to acetic acid fermentation; although acetic acid fermentation using a flavorful acid citrus fruit juice with a high citric acid content has been hitherto unsuccessful, the reduction treatment of citric acid content in the present invention has realized an efficient production of fruit vinegar with good body, savory taste and mild sourness that has not been hitherto produced.

9 Claims, No Drawings

US 7,005,149 B2

FRUIT VINEGAR FROM RAW MATERIAL FLAVORFUL ACID CITRUS FRUIT JUICE AND METHOD FOR PRODUCING THE SAME

TECHNICAL FIELD OF THE INVENTION

The present invention relates to a fruit vinegar prepared by using as a raw material the juice of flavorful acid citrus fruit with unique flavor and high acid content, such as lemon and lime, and a method for producing the fruit vinegar.

1. Prior Art

Generally, fruit vinegar is produced by decomposing sugar contained in a raw material fruit juice through alcohol fermentation into alcohol, and adding acetic acid bacteria thereto to induce therein acetic acid fermentation. If the sugar contained in the raw material is low, the alcohol concentration may be sometimes elevated by adding alcohol as a raw material after alcohol fermentation. The raw materials to be generally used are mainly apple and grape, and there has been no example of successful industrial production of fruit vinegar with rich body and good flavor, comparable to those of apple vinegar and wine vinegar, from citrus fruit, specifically flavorful acid citrus fruit (lemon, lime, yuzu (fruit of *Citrus junos*), kabosu (fruit of *Citrus sphaerocarpa*), sudachi (fruit of *Citrus sudachi*), Shiikuwasha (fruit of *Citrus depressa*, etc.) with unique flavor and high acid content (3 to 8%), has been known.

It is without doubt that natural fruit vinegar has been known from flavorful acid citrus fruit as raw material, but natural fruit vinegar is a common name of fruit juice squeezed from flavorful acid citrus fruit (for example, kabosu vinegar, yuzu vinegar, etc.), so said vinegar is different from fruit vinegar through acetic acid fermentation.

Brewed vinegar is a liquid seasoning, prepared by subjecting "moromi" (unrefined alcoholic product) prepared from raw material such as grain, fruit (including processed food such as squeezed juice of fruit, fruit liquor, etc., which is also applied hereinafter), sugar, saccharification solution of saccharide, etc. as raw material, "moromi" with addition of alcohol, or alcohol, etc. to acetic acid fermentation, and any brewed vinegar is widely used as seasoning with acid taste and with unique flavor, like the natural fruit vinegar described above (kabosu vinegar, yuzu vinegar, etc.). Because the irritating odor of acetic acid and odor derived from raw materials such as grain smell strongly from brewed vinegar, some like the vinegar very much but others hate the vinegar. And a flavorful acid citrus fruit juice has refreshing flavor, compared with brewed vinegar, but flavorful citrus juice is poor in terms of savory taste, and therefore, the juice does not taste rich.

2. Problems To Be Solved By the Invention

In such circumstances of the state of the art, the present invention has been attained for the purpose of producing good fruit vinegar from flavorful acid citrus fruit, namely fruit vinegar from fruit as the raw material at its total amount used being 100 g or more as juice per one liter of brewed vinegar.

3. Means for Solving the Problems

So as to attain the object, the present inventors have made investigations from various standpoints, and have focused their attention to citric acid, as one difference between flavorful acid citrus fruit juice and fruit juices of apple and grape.

As the result of intensive examinations of the properties of citric acid, attention has been focused on the fact that the pH is lower in citric acid than in acetic acid. Actually it was confirmed that when the concentration of citric acid was elevated in fruit juice, the pH was rapidly lowered; it was confirmed for example that the pH of 30 mg/ml citric acid was lowered to or below 2.5. If a fruit juice containing much citric acid is used for "moromi", the activity of acetic acid bacteria is damaged owing to lowering of the pH of the "moromi". Therefore, fruit juice not-containing so much citric acid, such as apple juice or grape juice, can be readily subjected to acetic acid fermentation, so that apple vinegar and grape (wine) vinegar can be prepared. For "moromi", however, flavorful acid citrus fruit juice with higher citric acid content can be used only at a fruit juice concentration (0 to 10%) with less effect on pH, and therefore, it is impossible to produce fruit vinegar from such fruit juice according to a conventional method.

It is surely possible to add an alkali agent to "moromi", so as to elevate the pH of the "moromi", of which pH has been decreased due to the use of fruit juice, but because the addition of an alkali agent affects severely the flavor of the resulting fruit vinegar, it is impossible to produce fruit vinegar with natural flavor unique to flavorful acid citrus fruit; because of the addition of the alkali agent, essentially natural fruit vinegar cannot be made or the resulting product cannot be labeled as fruit vinegar.

Therefore, after examination with attention again drawn to the relation between the content of citric acid and pH, the inventors have firstly focused their attention to the fact that the pH is decreased to or below 2.5 at a citric acid content of 30 mg/ml in fruit juice, but the pH is increased to 3.0 or more at a citric acid content of 10 mg/ml. Based on the finding, the present inventors have intended to reduce or remove completely citric acid per se from flavorful acid citrus fruit juice, thereby producing fruit vinegar, whereby the primary object can be achieved. After intensive investigations, the inventors have confirmed that the objective fruit vinegar can be produced, and then, the present invention has been achieved successfully.

SUMMARY OF THE INVENTION

The present invention relates to a method for producing fruit vinegar which comprises subjecting a flavorful acid citrus fruit juice with a low citric acid content or its dilution, in the presence of alcohol (ethanol), to acetic acid fermentation by acetic acid bacteria.

The present invention is summarized as a method for producing fruit vinegar characterized by using, as a raw material, a flavorful acid citrus fruit juice with a citric acid content reduced to 50% by weight or less of the natural citric acid content (3 to 8%) or a flavorful acid citrus fruit juice with a citric acid content reduced by 50 to 100% by weight of the natural citric acid content (3 to 8%) in a flavorful acid citrus fruit juice by acid reduction treatment, as a means for producing fruit vinegar with natural flavor unique to flavorful acid citrus fruit.

The acid reduction treatment is a treatment for reducing or removing a part or the entirety of citric acid contained in fruit juice. In the present invention, it is desirable to remove an amount of citric acid corresponding to 50 to 100% by weight of the whole amount of citric acid contained in fruit juice to adjust the pH of fruit juice to 3.0 or more. The treatment method includes a method for reducing the content of citric acid in fruit comprising a process of dosing trees with a solution of B vitamins after fruit bearing to reduce the citric acid content in fruit, and a method for removing a part or the whole of citric acid contained in fruit juice from the fruit juice, comprising adding calcium carbonate to the fruit juice and then removing generated precipitate or subjecting the fruit juice to removal by adsorption in resin treatment (for example, contact with anion exchange resin). Juice with less amount of citric acid contained in the natural fruit juice may be used as it is with no acid reduction treatment, or both may be blended if necessary.

The dilution of the flavorful acid citrus fruit juice is a solution obtained by diluting said juice with at least one selected from the group consisting of water, an aqueous solution of glucose, various fruit juices each having a low citric acid content such as apple juice and grape juice, saccharification solutions of starches such as potato, and saccharification solutions of grain flours such as maize flour (corn flour).

In the dilution, the desirable concentration (use amount) of the flavorful acid citrus fruit juice is not less than 10% by weight and is less than 100% by weight.

In order to make the flavorful acid citrus fruit juice or its solution contain alcohol (ethanol), said juice or said dilution is subjected, as it is or after addition of sugar, to alcohol fermentation or/and receives addition of alcohol or an aqueous solution of alcohol.

In the present invention, the flavorful acid citrus fruit juice with a low citric acid content or its dilution is subjected, as it is or after addition of sugar, to alcohol fermentation.

The sugar to be added includes glucose, sucrose and substance obtained by decomposing of saccharide, etc. Other additives to be used include nutritive source for yeast composed of glucose, mineral, yeast extract and vitamins; these sugar and nutritive source etc. are desirable to promote the alcohol fermentation.

The alcohol fermentation is started by addition of yeast. The yeast to be used includes yeast for "sake" and yeast for wine, etc.; for example, Nippon Jozo Kyokai yeast No. 7, etc., which are commercially available, are desirable.

The alcohol fermentation, which is carried out in the temperature range of about 10 to about 30° C. in a fermentation tank, is terminated in about a week, and if necessary, brewed vinegar is added thereto to facilitate the acetic acid fermentation, thereby producing "moromi".

In the present invention, "moromi" for the acetic acid fermentation may be prepared by alcohol fermentation or/and by addition of an aqueous 10 to 20% alcohol solution. The alcohol concentration of "moromi" for the acetic acid fermentation is desirable to be about 4% to about 6%; 5% is suitable for the start of the acetic acid fermentation.

"Moromi" prepared by the alcohol fermentation or/and by the addition of alcohol is poured into a commercially available tank (acetator) for acetic acid fermentation in which aeration can be carried out, and alcohol concentration is controlled by addition of water or alcohol if necessary, and acetic acid bacteria are inoculated and nutritive source composed of inorganic salts comprising phosphate and ammonium salt, etc. is added, in order to start the acetic acid fermentation.

The acetic acid fermentation is started by inoculation of acetic acid bacteria.

As acetic acid bacteria in the present invention, any acetic acid bacteria, e.g., acetic acid bacteria for rice vinegar or other vinegar, may be used that can produce acetic acid. For example, *Acetobacter aceti* IFO 3281, *Acetobacter aceti* IFO 3283, *Acetobacter aceti* IFO 14818, and *Acetobacter pasteurianus* IFO 14814, etc. can be used effectively.

It is desirable that such acetic acid bacteria are first cultured to make seed culture and then the obtained seed culture is added into the tank.

The acetic acid fermentation may be carried out by a rapid brewing method in the temperature range of about 25 to about 35° C. with aerating for about a week to about 10 days.

It is desirable to bring about the elevated final concentration of acetic acid by adding, one time or plural times from time to time or on occasion, alcohol or an aqueous alcohol solution between the initiation of the acetic acid fermentation and the end thereof. Generally, it is desirable to elevate the acetic acid concentration to about 10% by adding of an aqueous 20% alcohol solution at about 4 hour intervals in an amount of 10% by weight based on the amount of "moromi", to which water has been added, to be subjected to the acetic acid fermentation.

Further, it has been found that if desired, when a common flavorful acid citrus fruit juice is added in an amount of 0.01 to 10% during the latter half of the acetic acid fermentation, a feature of flavorful acid citrus fruit is exhibited more effectively without damaging the acetic acid fermentation. The addition of a common flavorful acid citrus fruit juice enhances flavor and taste. When a common flavorful acid citrus fruit juice is added at one time or plural times at from the middle stage to the last stage of the acetic acid fermentation, mild flavor and taste are exhibited without suppressing the acetic acid fermentation.

A rapid brewing method wherein the period of fermentation time is short is better, as a method of the acetic acid fermentation, in producing fruit vinegar having outstandingly a feature of flavorful acid citrus fruit but not having undesirable flavor and taste.

After the acetic acid fermentation, the obtained fermented solution was allowed to stand for formation of sediment, and is, further, ripened in a tank therefor, and is, then, subjected to ultrafiltration to give a final product.

After the acetic acid fermentation or after its ripening, in the case that the fermented solution is not subjected to sterilizing by heating but subjected to ultrafiltration to remove bacteria, fruit vinegar is produced which retains flavor specific to a flavorful acid citrus fruit more remarkably.

DETAILED DISCRIPTION OF THE INVENTION

Examples of the present invention are described hereafter.

EXAMPLE 1

A method for producing lemon vinegar from lemon juice as a flavorful acid citrus fruit juice, which is an example of the production method of the present invention, is as follows.

As a raw material, was used 100 kg of acid reduced lemon concentrated juice (Bx: 30, acidity: 2.0%) after acid reduction treatment for removing about 90% of the citric acid contained in the fruit juice; the acid reduction treatment was carried out by addition of calcium carbonate to the fruit juice, followed by removing the generated precipitate.

The acid reduced lemon concentrated juice was placed in a tank, followed by addition thereto of Nippon Jyozo Kyokai yeast No. 7, and a nutritive source for yeast composed of glucose, mineral, yeast extract and vitamins. Then, alcohol fermentation was carried out in the temperature range of 20 to 30° C. for about a week to produce "moromi".

The obtained "moromi" was poured into a fermentation tank (acetator) for a rapid brewing method. Into the acetator was added water to give the solution of about 500 liters in total. To the solution was added the seed culture of acetic acid bacteria *Acetobacter aceti* IFO 3281 as well as nutritive source composed of inorganic salts (phosphate, ammonium salt, etc.), thus initiating acetic acid fermentation at 25° C. with aerating. While monitoring the residual alcohol concentration in the acetator, an aqueous 20% alcohol solution was added thereto in an amount of 5 to 10% at about 4 hour intervals, thereby the total solution volume becoming 900 liters. When the acetic acid fermentation progressed until the alcohol concentration in the acetator reduced to 1.5%, a common lemon juice of 100 kg was added into the acetator to continue the fermentation until the alcohol concentration was reduced below 0.1%. Thereafter, water was added thereto until the acetic acid concentration reached about 10%. The water-added solution was allowed to stand for formation of sediment, and then subjected to ultrafiltration to remove bacteria to finally produce a lemon vinegar of a total volume of 1000 liters (Bx: 9, total acidity: 11% (as acetic acid acidity); acetic acid concentration: 10%).

The lemon vinegar thus produced has a good refreshing lemon flavor and less of the irritating odor of acetic acid, compared with grain vinegar at the same concentration of acetic acid. When used in cooking, the whole taste was felt to be mild, compared with the taste when grain vinegar was used.

EXAMPLE 2

As a raw material, 100 kg of acid reduced lemon concentrated juice was used (Bx: 30, acidity: 2.0%) after acid reduction treatment for removing about 90% of citric acid contained in the fruit juice; the acid reduction treatment was carried out by addition of calcium carbonate to the fruit juice, followed by removing the generated precipitate.

To an acetator, were poured said acid-reduced juice of 100 kg and an aqueous 20% alcohol solution of 100 liters, and water to prepare a total solution volume of about 500 liters. To the resultant solution, was added nutritive source composed of inorganic salts (phosphate, ammonium salt, etc.) and was inoculated the seed culture of acetic acid bacteria *Acetobacter aceti* 14818. Thus, acetic acid fermentation was initiated at 25° C. with aerating. When monitoring the residual alcohol concentration in the acetator, an aqueous 20% alcohol solution was added thereto in an amount of 5 to 10% at about 4 hour intervals, thereby the total solution volume becaming 900 liters. When the alcohol concentration was reduced to below 0.1%, water was added thereto to prepare a total solution volume of 1000 liters. The solution of 1000 liters was allowed to stand for formation of sediment, and then subjected to ultrafiltration to remove bacteria to finally produce a lemon vinegar of a total volume of 1000 liters (Bx: 8, total acidity: 10% (as acetic acid acidity); acetic acid concentration: 10%).

ADVANTAGES OF THE INVENTION

In accordance with the present invention, fruit vinegar can be produced from flavorful acid citrus fruit, which has never been hitherto produced. The fruit vinegar has advantages of both natural fruit vinegar and brewed vinegar. In other words, the fruit vinegar has absolutely no odor from grain or the like but has a refreshing flavor unique to flavorful acid citrus fruit, functioning to reduce the irritating odor of acetic acid, as frequently observed in other fruit vinegars. Therefore, even if this vinegar is used as it is for cooking, individuals who hesitate to take vinegar can satisfactorily take the vinegar. Furthermore, compared with natural fruit vinegar, the preservability and quality are stable, the savory taste is strong and the taste is thick and deep. When used in cooking, this vinegar can give complex taste with no development of acetic acid taste but with rich taste due to the savory taste and the like.

Accordingly, "sunomono" (dishes dressed with the vinegar) with less of the irritating odor of acetic acid, can be prepared, and persons hesitating to take brewed vinegar can take the dishes. If the vinegar is used for "sumeshi" (vinegar-added cooked rice for "sushi" (fish and rice, shellfish and rice, etc., caked respectively)), "sumeshi" for "chirashi-zushi" (an uncaked "sushi" in which various food materials such as sliced meat of fish are put on the whole of the top of "sumeshi") can be made which is more refreshing than "sumeshi" using conventional brewed vinegar. Additionally, some persons drink fruit vinegar. If the fruit vinegar of the present invention is used, drinks with less irritating odor and which are easier to drink than those from other fruit vinegars can be prepared.

What is claimed is:

1. A method for producing a fruit vinegar comprising subjecting to acetic acid fermentation by acetic acid bacteria in the presence of ethanol one member selected from the group consisting of (a) and (b), wherein
    (a) is a member selected from the group consisting of lemon juice, lime juice, yuzu juice, kabosu juice, sudachi juice, and shii kuwasa juice, wherein said member is
    (1) juice having naturally a pH value of 3.0 or more;
    (2) juice having a pH value of 3.0 or more adjusted, not by addition of an agent to neutralize citric acid but by reducing citric acid content by from 50 to 100% by weight, or
    (3) a mixture of (1) and (2); and
    (b) a dilution of (a);
    wherein the reducing of citric acid content in (2) has been effected by
    (i) adding calcium carbonate to the member to precipitate calcium citrate and removing the calcium citrate or
    (ii) contacting the member with an anion exchange resin to remove citric acid therefrom.

2. The method according to claim 1 wherein the concentration of (a) in the dilution of (b) is not less than 10% by weight and is less than 100% by weight.

3. The method according to claim 1 wherein the dilution of (a) is prepared by diluting (a) with at least one member selected from the group consisting of water, an aqueous solution of glucose, a fruit juice, a saccharification solution of starch and a saccharification solution of grain flour.

4. The method according to claim 3 wherein the fruit juice is at least one member elected from the group consisting of apple juice and grape juice.

5. The method according to claim 1 wherein the ethanol is prepared by at least one method selected from the group consisting of:
    (A) subjecting one member selected from the group consisting of (a) and (b) to alcohol fermentation using yeast; and
    (B) adding ethanol or an aqueous solution of ethanol.

6. The method according to claim 5 wherein ethanol or an aqueous solution of ethanol is further added once or at a plurality of times between initiation of acetic acid fermentation and the end of the acetic acid fermentation.

7. The method according to claim 1 wherein one member selected from the group consisting of lemon juice, lime juice, yuzu juice, kabosu juice, sudachi juice and shii kuwasa juice, wherein each juice has a citric acid content of 3 to 8% by weight, is further added one time or several times in the latter half of the acetic acid fermentation.

8. The method according to claim 1 wherein the acetic acid fermentation is carried out by using an acetator.

9. The method according to claim 1 wherein after the acetic acid fermentation, the fruit vinegar is subjected to ultra filtration.

* * * * *